United States Patent [19]

Kaneko et al.

[11] Patent Number: 4,974,097
[45] Date of Patent: Nov. 27, 1990

[54] DATA COMMUNICATION APPARATUS

[75] Inventors: Yoji Kaneko; Tomoyuki Haganuma, both of Yokohama; Atsushi Amakasu, Kamakura, all of Japan

[73] Assignee: Canon Kabushiki Kaisha, Tokyo, Japan

[21] Appl. No.: 453,128

[22] Filed: Dec. 6, 1989

Related U.S. Application Data

[63] Continuation of Ser. No. 120,104, Nov. 13, 1987, abandoned.

[30] Foreign Application Priority Data

Nov. 18, 1986 [JP] Japan .................. 61-276274
Nov. 18, 1986 [JP] Japan .................. 61-276275
Nov. 18, 1986 [JP] Japan .................. 61-276276
Dec. 16, 1986 [JP] Japan .................. 61-300808

[51] Int. Cl.⁵ ............................................ H04N 1/00
[52] U.S. Cl. ...................................... 358/400; 358/401
[58] Field of Search ................ 358/75, 78, 400, 442, 358/407, 256, 257, 401, 405, 406; 379/100, 98, 97, 96; 340/825; 370/24

[56] References Cited

U.S. PATENT DOCUMENTS

| | | | |
|---|---|---|---|
| 4,058,672 | 11/1977 | Crager et al. | 358/407 |
| 4,080,517 | 3/1978 | Moricca | 379/164 |
| 4,156,798 | 5/1979 | Doelz | 358/407 |
| 4,420,831 | 12/1983 | Hackett | 370/24 |
| 4,445,211 | 4/1984 | Webber | 379/201 |
| 4,491,876 | 1/1985 | Takayama | 358/257 |
| 4,533,958 | 8/1985 | Herget | 358/280 |
| 4,583,124 | 4/1986 | Tsuji | 358/256 |
| 4,644,409 | 2/1987 | Fuchs | 358/257 |
| 4,685,123 | 8/1987 | Hsia | 379/98 |
| 4,736,249 | 4/1988 | Iizuka | 358/257 |
| 4,746,986 | 5/1988 | Tanigawa | 358/256 |
| 4,876,604 | 10/1989 | Nobuta | 358/443 |
| 4,918,722 | 4/1990 | Duehren et al. | 358/407 |

FOREIGN PATENT DOCUMENTS 0204654 9/1987 Japan .
0133753 6/1988 Japan .
0152264 6/1988 Japan .

Primary Examiner—Edward L. Coles, Sr.
Assistant Examiner—Jerome Grant
Attorney, Agent, or Firm—Fitzpatrick, Cella, Harper & Scinto

[57] ABSTRACT

A data communication apparatus includes a reader, a mode change unit, a GIII facsimile controller connected to a telephone line, a GIV facsimile controller connected to a data line, and a printer. The mode change unit includes a mode change controller, a dummy reader, a dummy printer, resolution converters, and switches. The mode change controller connects the GIII or GIV facsimile controller to the reader and the printer. The facsimile controller which is not connected to the reader and the printer is connected to the dummy reader and the dummy printer. The resolution converters convert resolutions of the data so as to match a source apparatus with a destination apparatus.

28 Claims, 9 Drawing Sheets

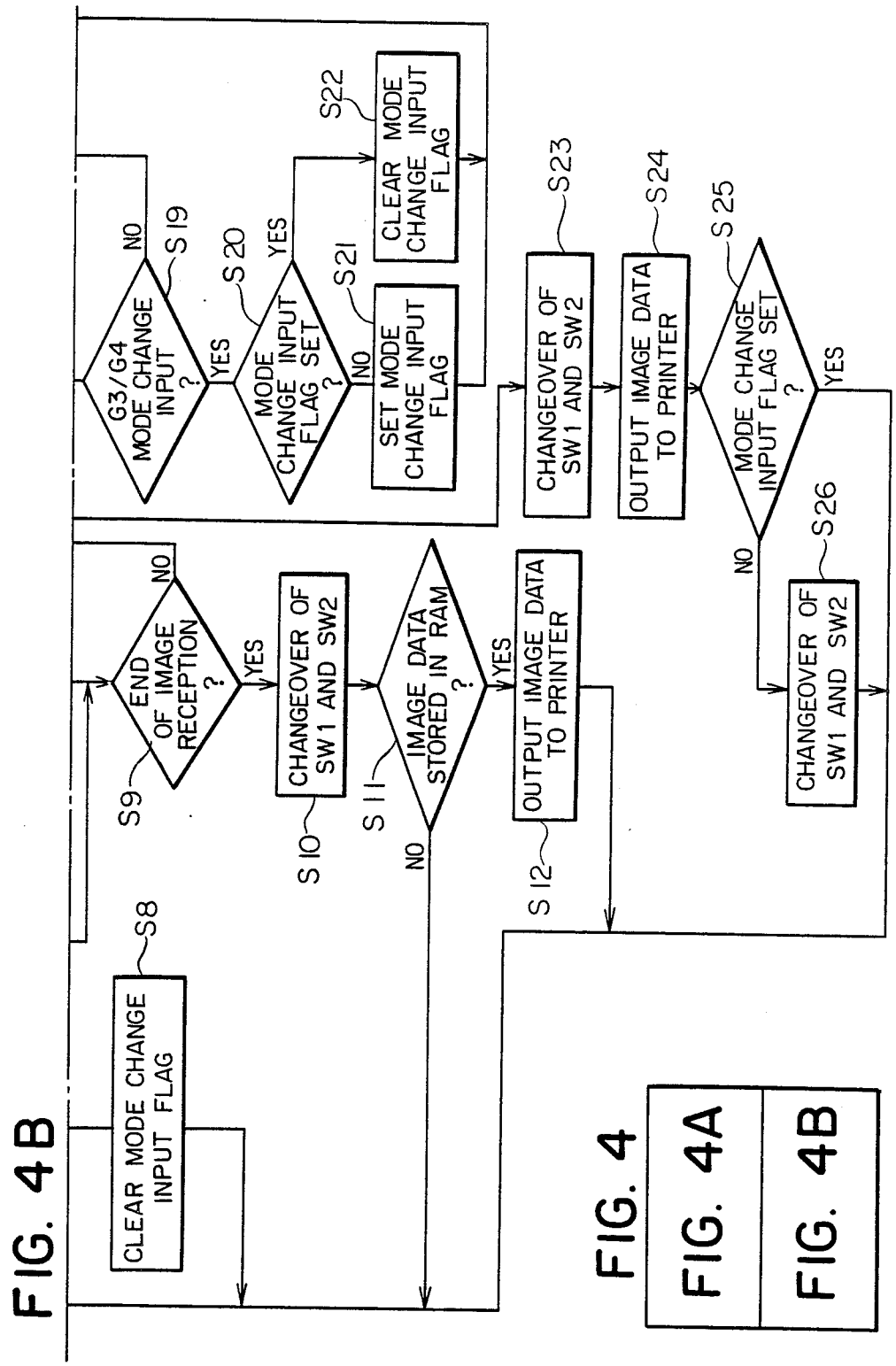

DATA COMMUNICATION APPARATUS

This is a continuation of Ser. No. 120,104 filed Nov. 13, 1987 which was abandoned Dec. 6, 1989.

BACKGROUND OF THE INVENTION

1. Field of the Invention

The present invention relates to a data communication apparatus having a plurality of communication modes.

2. Related Background Art

A conventional apparatus of this type such as a facsimile system for performing image data communication has a plurality of communication modes such as GII, GIII, and GIV modes recommended by the CCITT (International Consultative Committee of Telephone and Telegram). In order to allow a source apparatus to communicate with a destination apparatus set in any mode, control protocols and a controller arrangement of the apparatus are inevitably complicated.

When a plurality of communication modes such as GII, GIII, and GIV modes are controlled by a single controller, control of the controller is complicated and a variety of control operations cannot be provided.

U.S. Pat. Appln. S.N. 823,286/1986 and S.N. 813,514/1985 disclose data communication apparatuses connected to a plurality of communication lines. One controller is used in each of these apparatuses and control operations of the controller are inevitably complicated.

In GII, GIII and GIV facsimile systems, different image data compression schemes (coding schemes and the like) are employed in the GII, GIII and GIV modes, respectively. When image data compressed according to different compression schemes are stored in one memory, the compression scheme of each of the differently compressed types of compressed data must also be controlled, and the controller is overloaded as a result.

SUMMARY OF THE INVENTION

It is an object of the present invention to improve a data communication apparatus.

It is another object of the present invention to eliminate conventional drawbacks described above.

It is still another object of the present invention to provide a simple data communication apparatus capable of performing various communication control operations.

It is still another object of the present invention to provide a data communication apparatus capable of performing parallel data communication according to simple control.

It is still another object of the present invention to provide a data communication apparatus having a data communicating means for each of a plurality of different lines, wherein data communication is performed by changing over these data communicating means.

It is still another object of the present invention to provide a data communication apparatus for performing data communication by switching a plurality of communication lines, wherein a reservation for changing over to a given communication line while data communication using another communication line is being performed can be made.

It is still another object of the present invention to arrange a memory corresponding to each of a plurality of communication lines and to store data of each line in a corresponding one of the memories.

It is still another object of the present invention to provide a plurality of controllers for performing different data communication operations and to change over the plurality of controllers so as to provide a plurality of communication modes.

It is still another object of the present invention to set a plurality of data communication modes with simple control such that a plurality of controllers for performing data communication control commonly use one image reader and one printer.

The above and other objects, features, and advantages of the present invention will be apparent from the detailed description of preferred embodiments in conjunction with the accompanying drawings.

BRIEF DESCRIPTION OF THE DRAWINGS

FIGS. 4A and 4B are flow chart for explaining the operation of the data communication apparatus shown in FIG. 1;

DETAILED DESCRIPTION OF THE PREFERRED EMBODIMENTS

Preferred embodiments of the present invention will be described in detail with reference to the accompanying drawings.

Figure 1:
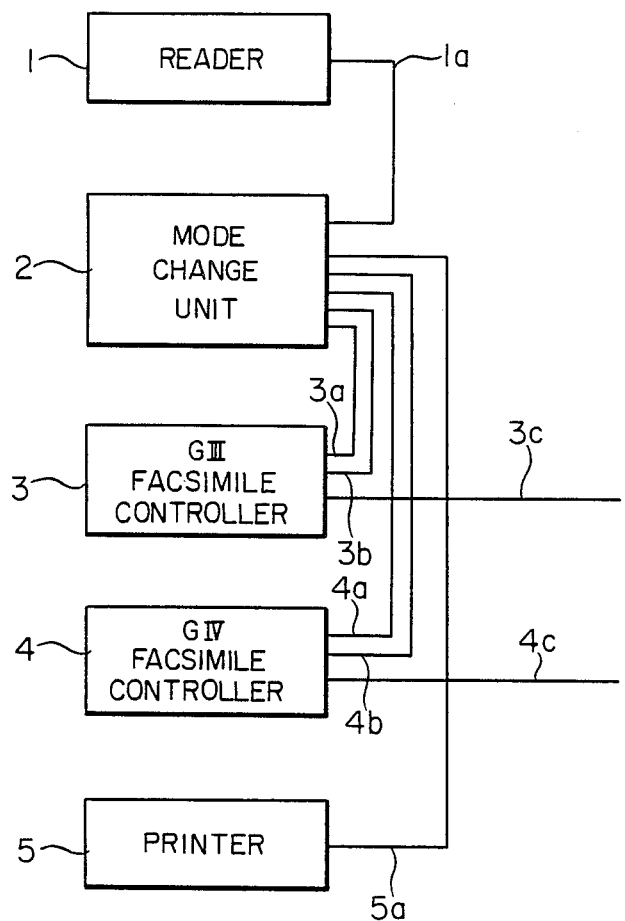
FIG. 1 is a block diagram showing a basic arrangement of a data communication apparatus according to an embodiment of the present invention.

FIG. 1 is a block diagram showing a basic arrangement of a facsimile system according to an embodiment of the present invention.

Referring to FIG. 1, the facsimile system includes a reader 1 for reading an image on an original and outputting an image signal corresponding to the read image. The reader 1 is connected to a mode change unit 2. The mode change unit 2 performs mode change control for a GIII facsimile controller 3, a GIV facsimile controller 4, the reader 1, and a printer 5.

The GIII facsimile controller 3 has a GIII facsimile communication control function, an image signal coding/decoding function according to an MH (Modified Huffman) or MR (Modified READ) scheme, and a modulation/demodulation function. More specifically, the GIII facsimile controller 3 serves as a controller for performing communication control for a GIII facsimile system complying with the recommendations of the CCITT. The GIII facsimile controller 3 is connected to a telephone line (general telephone circuit) 3C.

The GIV facsimile controller 4 serves as a controller for performing communication control for a GIV facsimile system complying with the recommendations of the CCITT. The GIV facsimile controller 4 performs image signal coding/decoding according to an MMR (Modified Modified READ) or two-dimensional coding/ decoding scheme and packet communication. The GIV facsimile controller 4 is connected to a digital line 4C. The printer 5 prints out an image signal on recording paper.

When the reader 1 and the printer 5 are connected to the GIII facsimile controller 3, the facsimile system serves as a normal GIII facsimile system. When the reader 1 and the printer 5 are connected to the GIV facsimile controller 4, the facsimile system serves as a normal GIV facsimile system. The characteristic feature of this embodiment lies in an arrangement wherein the known GIII and GIV facsimile controllers are commonly connected to one reader and one printer. The mode change unit 2 performs various mode change operations to provide a simple facsimile system having GIII and GIV communication functions.

Figure 2:
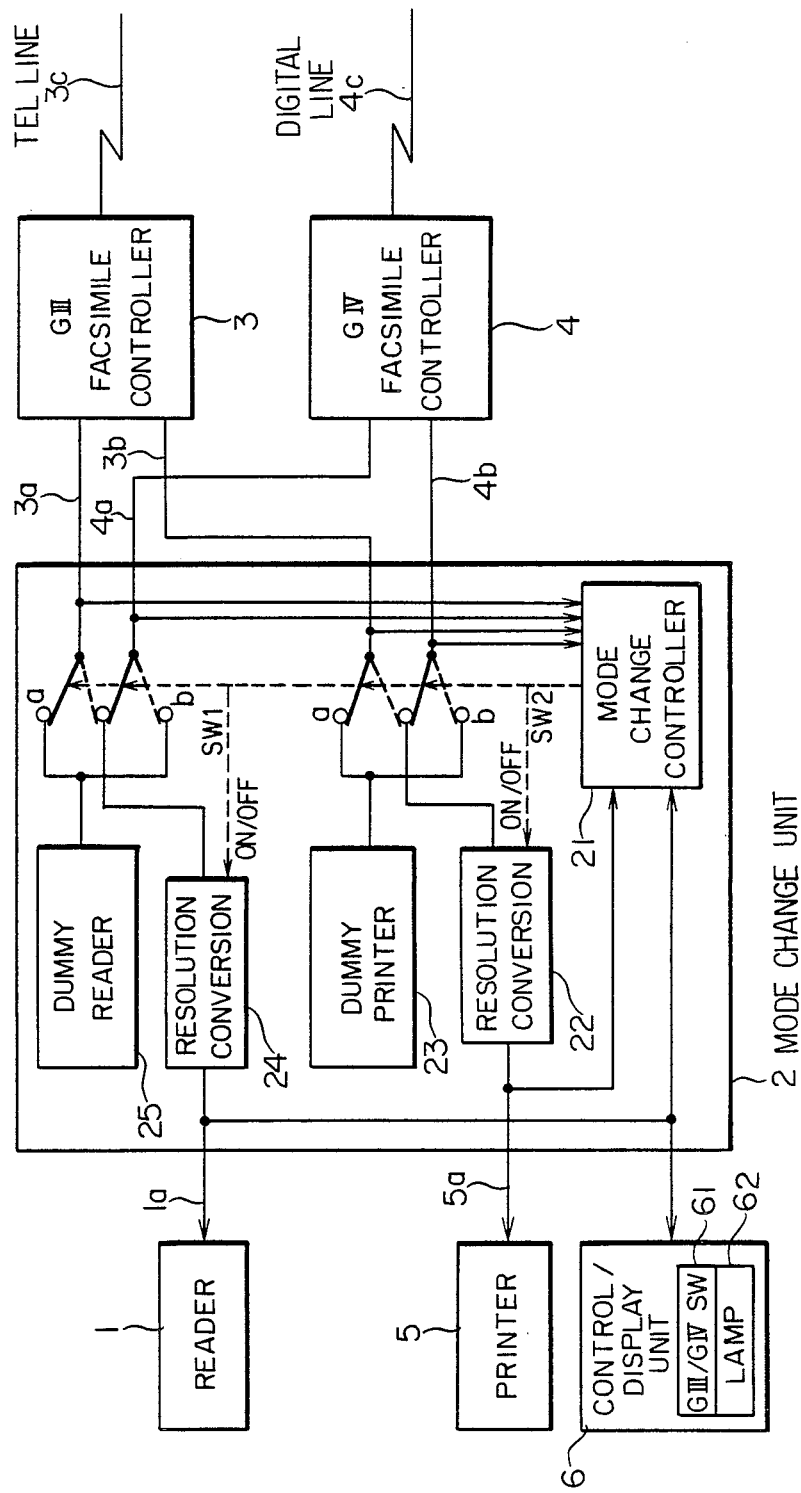
FIG. 2 is a block diagram showing a detailed arrangement of the data communication apparatus shown in FIG. 1.

FIG. 2 is a block diagram showing a detailed arrangement of the facsimile system. The detailed arrangement of this system will be described with reference to FIG. 2 below.

Referring to FIG. 2, the mode change unit 2 is connected to a console/display unit 6 for allowing an operator to perform various operations. The console/ display unit 6 includes a plurality of key input switches, a key input scanning circuit, a liquid crystal display for displaying mode information or LED indicators for indicating display information. More specifically, the console/display unit 6 includes a GIII/GIV selection switch 61 and a lamp 62 for indicating the GIII or GIV mode. When the facsimile system is set in the GIII mode, the lamp 62 indicates the GIII mode. The GIV mode is indicated in the GIV mode.

Figure 3:
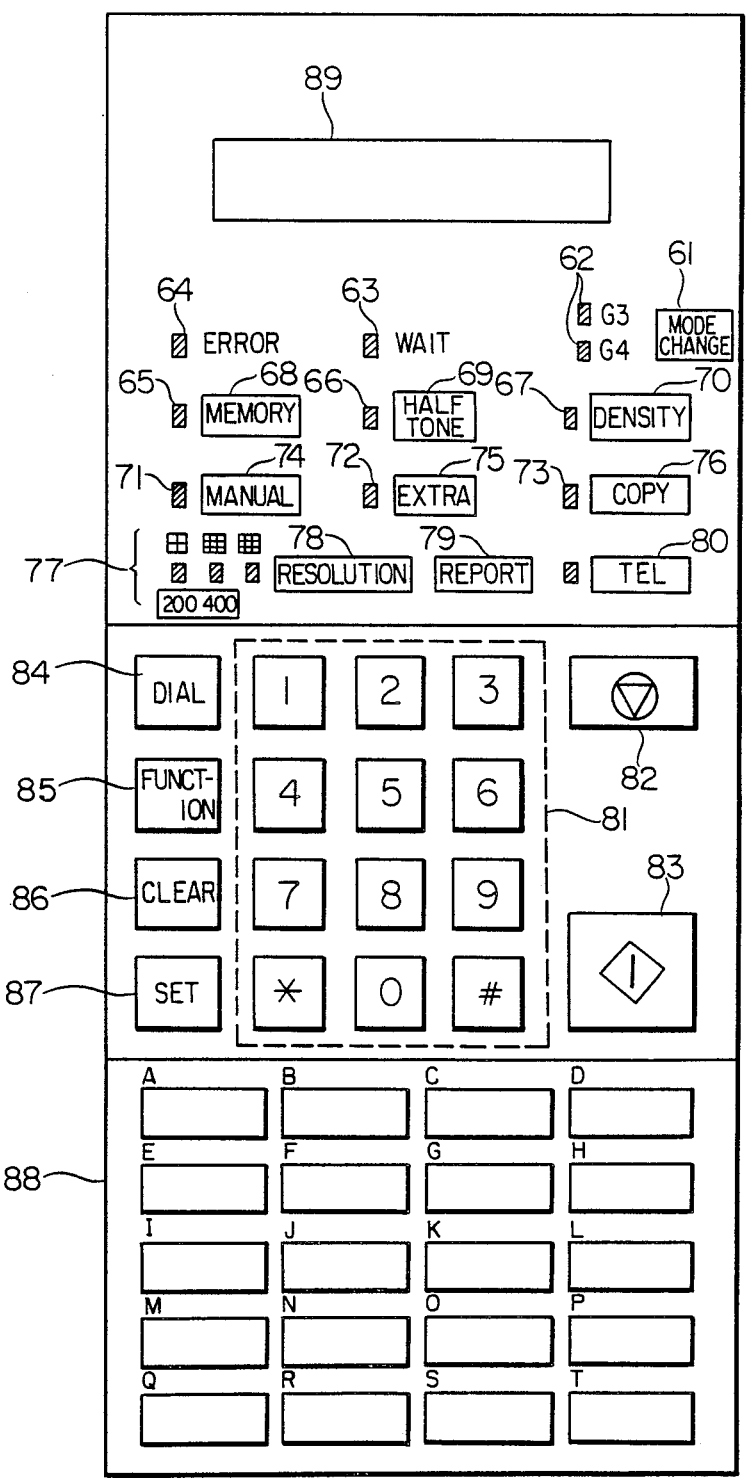
FIG. 3 is a view showing a console/display panel in a console/display unit of the data communication apparatus shown in FIG. 1.

FIG. 3 shows a console/display panel in the console/display unit. The panel includes a wait indicator 63, an error indicator 64, a memory indicator 65 for indicating that image data is stored in a memory, a halftone indicator 66 for indicating that a halftone mode is selected (in this embodiment, the halftone mode is set according to a dither scheme representing 16 gray scale levels; however, other schemes such as an error diffusion scheme may be used), a density indicator 67, a memory-receive selection key 68, a halftone mode selection key 69, a density key 70, a manual-receive mode indicator 71, an extra indicator (on-line connection indicator) 72, a copy mode indicator 73, a manual-receive mode selection key 74, an extra key 75, a copy key 76, resolution indicators 77, a resolution selection key 78, a communication control report output key 79, and a telephone key (TEL) 80.

The panel also includes a ten-key pad 81, a stop key 82, a start key 83, a dial key 84, a function key 85, a clear key 86, a set key 87, one-touch dial keys 88, and a liquid crystal display 89 for displaying time information and destination information.

Referring back to FIG. 2, the arrangement of the mode change unit 2 will be described in detail below. The mode change unit 2 includes a mode change controller 21, resolution conversion circuits 22 and 24, a dummy printer 23, a dummy reader 25, and switches SW1 and SW2.

The mode change controller 21 comprises a microcomputer, and microcomputer peripheral circuits such as a read-only memory (ROM), a random access memory (RAM), and an input/output port I/O. The RAM in the mode change controller 21 is a large-capacity memory (a memory for storing a plurality of pages) for storing an image signal (i.e., memory-receive) from a line.

The resolution conversion circuits 22 and 24 convert resolutions of the image signals. In general, GIII facsimile resolutions are 8 pels/mm (main scanning) and 3.85 pels/mm (subscanning); 8 pels/mm (main scanning) and 7.7 pels/mm (subscanning); 16 pels/mm (main scanning) and 16 pels/mm (subscanning). GIV facsimile resolutions are 200 ppi (=about 7.784 pels/mm) (main scanning) and 200 ppi (subscanning); and 400 ppi (=about 15.568 pels/ mm) (main scanning) and 400 ppi (subscanning). When the reader 1 and the printer 5 are commonly used in the GIII and GIV facsimile systems, the resolution conversion operations must be performed, for example, between (200 ppi, 200 ppi) and (8 pels/mm, 7.7 pels/mm), and between (16 pels/mm, 16 pels/mm) and (400 ppi, 400 ppi).

The reader 1 reads the image and the printer 5 prints out the image with resolutions of (8 pels/mm, 3.85 pels/mm), (8 pels/mm, 7.7 pels/mm), and (16 pels/mm, 16 pels/mm). When the GIV facsimile controller 4 is connected to the reader 1 and the printer 5, the resolution conversion circuit 22 converts the resolution of (200 ppi, 200 ppi) into the resolution of (8 pels/mm, 7.7 pels/mm) and the resolution of (400 ppi, 400 ppi) into (16 pels/mm, 16 pels/mm). The resolution conversion circuit 24 converts the resolution of (8 pels/mm, 7.7 pels/mm) into (200 ppi, 200 ppi) and the resolution of (16 pels/mm, 16 pels/mm) into the resolution of (400 ppi, 400 ppi). When the reader 1 and the printer 5 are operated with resolutions of 200 ppi and 400 ppi, the conversion operations opposite to those described above are performed by the resolution conversion circuits 22 and 24.

In this embodiment, either the GIII or GIV facsimile controller 3 or 4 is connected to the reader 1 and printer 5. In other words, the facsimile controller which is not connected to the reader 1 and printer 5 is always present. When the GIII and GIV facsimile controllers 3 and 4 are normally used, each controller periodically tests the states of the reader 1 and the printer 5 (a signal is sent to the reader 1 and the printer 5 and response signals therefrom are received by the facsimile controller). For this reason, when the facsimile controller is disconnected from the reader 1 and the printer 5, the controller is set in an error state. In order to prevent this, the dummy printer 23 and the dummy reader 25 are connected to the facsimile controller which is not connected to the reader 1 and the printer 5. When response signals are sent back from the dummy printer 23 and the dummy reader 25 in response to a test signal from the facsimile controller which is not connected to the reader 1 and the printer 5, the controller detects the states of the dummy reader 25 and the dummy printer 23 as if the reader 1 and the printer 5 are connected. Therefore, the conventional GIII and GIV facsimile controllers can be used without modifications. The switch SW1 is changed over to select the reader 1 or the dummy reader 25, and the switch SW2 is changed over to select the printer 5 or the dummy printer 23. The operations of the switches SW1 and SW2 are controlled by the mode change controller 21.

The mode change controller 21 monitors the states of the reader 1, the printer 5, the console/display unit 6, the GIII facsimile controller 3, and the G4 facsimile controller 4. The console/display unit 6 is connected to the facsimile controller which is currently connected to the reader 1 and the printer 5 and displays information from the connected facsimile controller.

The operation of the facsimile system having the above arrangement will be described below.

The mode change unit 21 always monitors an input state of the GIII/GIV selection switch 61 in the console/ display unit 6. When the GIII mode is selected, the switches SW1 and SW2 are set in the b positions. However, when the GIV mode is selected, the switches SW1 and SW2 are set in the a positions. During sending or reception under the control of one of the facsimile controllers 3 and 4, the mode change controller 21 monitors a mode change input at the GIII/GIV selection switch 61 and a receive request from the other facsimile controller. If the mode change input at the switch 61 is detected, the input is stored and the switches SW1 and SW2 are changed over when current sending or reception is completed. If the mode change controller 21 detects a receive request (i.e., an operation signal output from the disconnected facsimile controller to the dummy printer 23 is identified and the mode change controller 21 determines the presence or absence of a receive request) from the disconnected facsimile controller while the facsimile controller connected to the reader 1 and the printer 5 performs reception or sending, the mode change controller 21 receives information in the RAM (memory-receive). When currently performed reception or sending is completed, the switches SW1 and SW2 are changed over, and the received data is printed out.

Figure 4A:
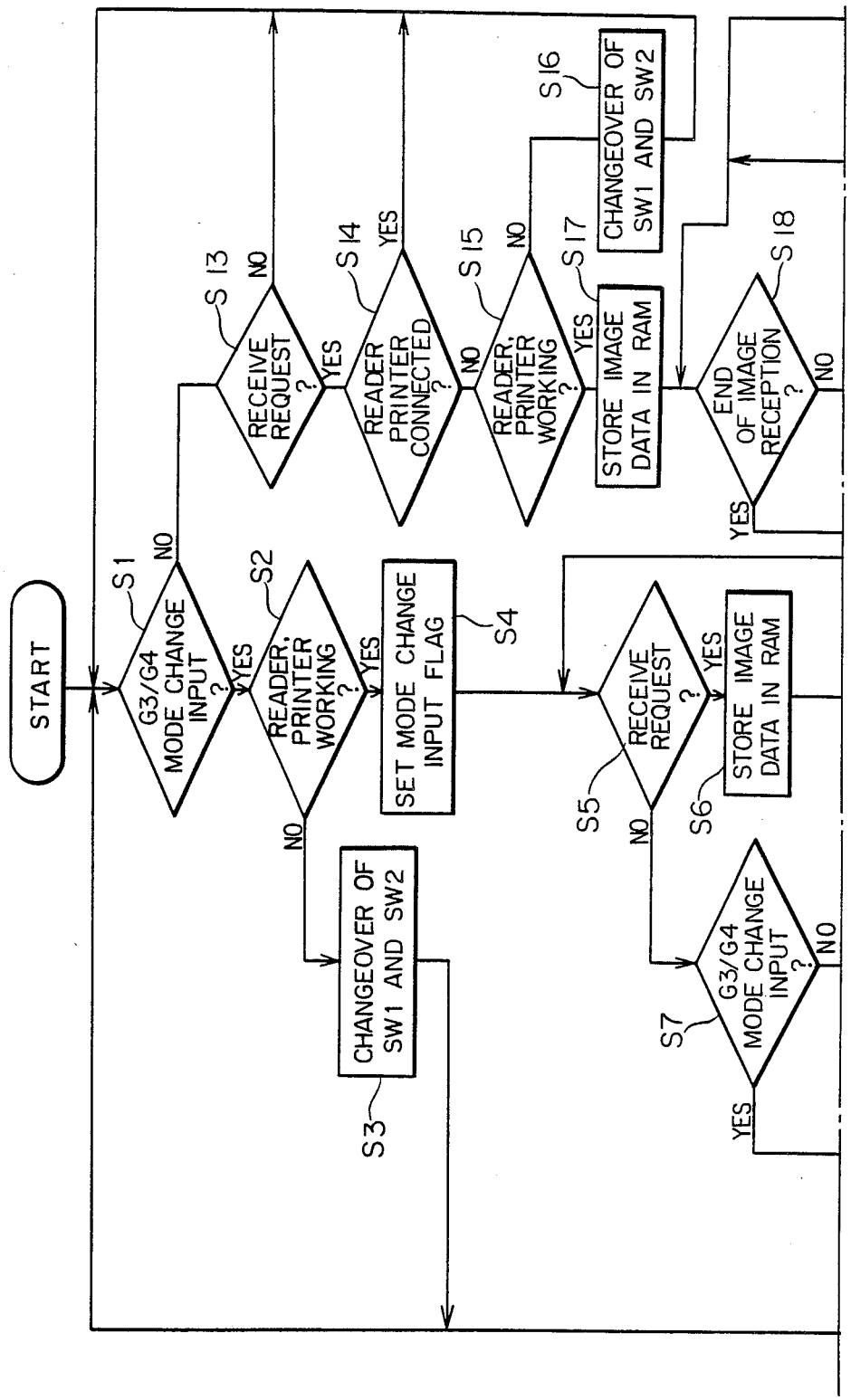

FIGS. 4A and 4B are flow charts showing control operations of the mode change controller 21 in the above embodiment. The program for executing the control operations on the basis of the above flow chart is stored in the ROM in the mode change controller 21.

The operation of this embodiment will be described with reference to the flow chart in FIG. 4.

The mode change controller 21 determines in step S1 whether a GIII/GIV mode change input at the GIII/GIV selection switch 61 in the console/display unit 6 is detected. If YES in step S1, the flow advances to step S2. However, if NO in step S1, the flow advances to step S13. The mode change controller 21 determines in step S13 whether a receive request from the GIII or GIV facsimile controller 3 or 4 is detected. In other words, the mode change controller 21 monitors the GIII/GIV mode change input and the presence/absence of the receive request.

If YES in step S1, the flow advances to step S2, as described above. In step S2, the mode change controller 21 determines whether the reader 1 or the printer 5 is working under the control of the facsimile controller connected thereto. This can be performed by determining the display state on the console/display unit 6. When the reader 1 is working, a message "sending" is displayed on the liquid crystal display 89 in the console/display unit 6. When the printer 5 is working, a message "receiving" is displayed on the liquid crystal display 89. When both the reader 1 and the printer 5 are working, the copy indicator 73 is turned on. However, when neither the reader 1 nor the printer 5 are working, current time is displayed on the liquid crystal display 89. The mode change controller 21 identifies the display state and determines whether the reader 1 or the printer 5 is working. If YES in step S2, the flow advances to step S4. However, if NO in step S2 (i.e., the liquid crystal display 89 displays current time), the flow advances to step S3. In step S3, the switches SW1 and SW2 are changed over. When the mode change controller 21 outputs logic "1" to the switches SW1 and SW2, they are set in the a positions. However, when the mode change controller 21 outputs logic "0" to the switches SW1 and SW2, they are set in the b positions. The mode change signals of logic "1" and logic "0" are alternately output upon sequential depression of the GIII/GIV selection switch 61. More specifically, the GIII/GIV selection switch 61 is depressed once and the switches SW1 and SW2 are set in the a positions (i.e., output "1"). When the GIII/GIV selection switch 61 is depressed next, the switches SW1 and SW2 are changed over to the b positions (i.e., output "0"). The resolution conversion circuits 22 and 24 are rendered operative in response to a mode change signal of logic "1" from the mode change controller 21. The resolution conversion circuits 22 and 24 convert the resolutions of the input image signals and output converted image signals. When a mode change signal of logic "0" is output, the resolution conversion circuits 22 and 24 are disabled.

The mode change controller 21 determines in step S2 that the reader 1 or the printer 5 is working. In this case, the flow advances to step S4. A mode change flag in the RAM is set at logic "1", and the flow advances to step S5.

In step S5, the mode change controller 21 determines whether the operation signal is output from 25 and the dummy printer 23, to the dummy printer 23 (i.e., whether a receive request from a line is present). If NO in step S5, the flow advances to step S7. However, if YES in step S5, the flow advances to step S6 in which the image data output from the facsimile controller connected to the dummy printer 23 are sequentially stored in the RAM. When the receive operation is completed, the flow advances to step S9.

When the flow advances from step S5 to step S7, the mode change controller 21 determines whether a mode change input from the GIII/GIV selection switch 61 is present. If YES in step S7, the flow advances to step S8 wherein a mode change flag of the RAM is cleared in step S8. The flow then returns to step S1. However, if NO in step S7, the flow advances to step S9.

The display contents of the liquid crystal display 89 in the console/display unit 6 are changed to current time in step S9. The mode change controller 21 determines in step S9 whether the reader 1 or the printer 5 is rendered inoperative. If NO in step S9, the flow returns to step S5. However, if YES in step S9, the flow advances to step S10.

When the flow advances to step S10, the switches SW1 and SW2 are changed over, and the mode change input flag of the RAM is cleared The mode change controller 21 determines in step S11 whether the image data is stored. If YES in step S11, the mode change controller 21 outputs the operation signal to the printer 5. Thereafter, the image data are sequentially read out from the RAM and are printed out. When printout operation is completed, the flow returns to step S1.

If the mode change controller 21 determines in step S13 that a receive request from the line 3C or 4C is present, the flow advances to step S14 The mode change controller 21 then determines in step S14 whether the receive request is sent from the facsimile controller connected to the reader 1 and the printer 5. If YES in step S14, the flow returns to step S1. Otherwise, the flow advances to step S15.

The mode change controller 21 determines in step S15 whether the reader 1 or the printer 5 is working. If NO in step S15, the flow advances to step S16, and the switches SW1 and SW2 are changed over. Thereafter, the flow returns to step S1. When a receive request is sent from a line while the reader 1 or the printer 5 is not working, the switches SW1 and SW2 are changed over and the reader 1 and the printer 5 are connected to the facsimile controller which sent this receive request.

If the mode change controller 21 determines in step S15 that the reader 1 or the printer 5 is working, the flow advances to step S17, and the image signal output from the facsimile controller to the dummy printer 23 is stored in the RAM. When image reception is completed, the flow advances to step S18.

The mode change controller 21 determines in step S18 whether working of the reader 1 or the printer 5 is ended. If YES in step S18, the flow advances to step S23. However, if NO in step S18, the flow advances to step S19. The mode change controller 21 determines in step S19 whether a mode change input from the GIII/GIV selection switch 61 is present. If YES in step S19, the mode change controller 21 determines in step S20 whether the mode change input flag is set. If YES in step S20, the flow advances to step S22 and the mode change input flag is cleared. However, if NO in step S20, the flow advances to step S21, and the mode change input flag is set. Thereafter, the flow returns to step S18.

When the flow advances from step S18 to step S23, the switches SW1 and SW2 are changed over. The mode change controller 21 sends an operation signal to the printer 5 in step S24. The image signals are sequentially read out from the RAM and are printed out at the printer 5. When the printout operation is completed, the flow advances to step S25.

The mode change controller 21 determines in step S25 whether the mode change input flag is set. If NO in step S25, the mode change controller 21 changes over the switches SW1 and SW2 in step S26. The mode change input flag is then cleared, and the flow returns to step S1.

One of the GIII/GIV mode indicators 62 in the console/display unit 6, which corresponds to the facsimile controller connected to the reader 1 and the printer 5, is turned on. When a GIII/GIV mode change input is present during working of the reader 1 or the printer 5, the lamp for the facsimile controller which reserves the receive request flickers, thereby indicating that the receive request has been reserved.

The memory indicator 65 is turned on during the working of the reader 1 or the printer 5 when storage-receive is detected. The GIII/GIV mode indicator 62 which corresponds to storage-receive flickers, thereby signalling to the operator that the storage-receive mode is set. Display control is performed by the mode change controller 21.

In this embodiment, the image signal stored in the RAM in the mode change controller 21 is a decoded image signal. However, the mode change controller 21 may perform encoding and decoding according to the MH, MR, or MMR scheme of the image signal, and the GIII and GIV facsimile controllers 3 and 4 may process the encoded image signals.

In the above embodiment, when a receive request is input from a line connected to the other facsimile controller during working of the reader 1 or the printer 5 connected to one facsimile controller, the image signal from the other controller is stored in the RAM in the mode change controller 21. However, nonvolatile memories each having a storage capacity corresponding to a plurality of pages may be connected to the GIII and GIV facsimile controllers 3 and 4. An abnormal signal such as a "no paper" signal may be output from the mode change controller 21 in response to the operation signal output from the GIII or GIV facsimile controller 3 or 4 to the dummy printer 23. In this case, the facsimile controller connected to the dummy printer 23 performs storage-receive operation.

In this embodiment, the telephone line 3C and the digital line 4C are connected to the data communication apparatus of this embodiment. Image data from the telephone line 3C can be transferred to the digital line 4C (and vice versa) in the following manner.

The operator depresses the extra key 75 in the console/display unit 6 to select a transfer mode. Destination information (e.g., a telephone number) is input with the ten-key pad. The liquid crystal display 89 displays both the transfer mode and the transfer destination. When a receive request from the line 3C or 4C is present, the mode change controller 21 determines the transfer mode according to the display state of the liquid crystal display 89. In this state, the mode change controller 21 receives the destination information of the transfer destination. If the line sending the receive request is the same as the line connected to the transfer-destination apparatus (for example, a receive request is sent from the digital line 4C and the transfer-destination apparatus is also connected to the digital line 4C), the received image signal (the coded image signal) is temporarily stored in the RAM in the mode change controller 21. The mode change controller 21 outputs a send start signal and transfer destination dial data to the facsimile controller. The facsimile controller performs dialing on the basis of the dial data. When the transfer-destination apparatus is engaged with the line and the communication mode is set according to communication protocols, the facsimile controller outputs a read start signal to the reader 1. When the mode change controller 21 receives the read start signal input from the facsimile controller to the reader 1, the received image data stored in the RAM is output to the controller.

When the line for sending the receive request is different from the line connected to the transfer-destination destination apparatus (e.g., a receive request is sent through the digital line 4C, and the transfer-destination apparatus is connected to the telephone line 3C), the mode change controller 21 sequentially stores the received image signals (i.e., the decoded image signals) in the RAM. At this time, if the received image signal is sent through the digital line 4C, the image data is converted by the resolution conversion circuit 22 and the converted data is stored in the RAM (if the received image data is sent from the telephone line 3C, the decoded image data is stored in the RAM). When image reception is completed, the mode change controller 21 changes over the switches SW1 and SW2 and the send start signal and the destination dial data are output to the connected facsimile controller. When the destination is connected to the line by the facsimile controller and the communication mode is set, the mode change controller 21 sequentially outputs and transfers the image data from the RAM to the facsimile controller in response to the read start signal. In this case, when image data is to be transferred to the telephone line 3C, the data stored in the RAM has already been resolution-converted. Therefore, this data is output to the GIII facsimile controller 3 without modification. However, if the data is transferred onto the digital line 4C, the resolution of the data is converted, and the resultant data is output to the GIV facsimile controller 4.

Data transfer from the telephone line 3C (or the digital line 4C) to the digital line 4C (or the telephone line 3C) can be easily performed as described above.

In the above embodiment, the switches SW1 and SW2 are simultaneously changed over. However, the switches SW1 and SW2 may be independently changed over. In this case, sending through one line and reception through the other line can be simultaneously performed. More specifically, the system component which is working during sending through one line is the reader 1, and the printer 5 is rendered inoperative. For this reason, the mode change controller 21 determines in step S15 (FIG. 4) whether the printer 5 is working. If NO in step S15, only the switch SW2 is changed over in step S16 and the printer 5 is connected to the facsimile controller which has sent a receive request. The operator judges whether current reception is performed in the GIII or GIV mode on the basis of the display contents of the GIII/GIV mode on the console/display panel. If the operator wishes to perform sending through a facsimile controller which is not currently operated, the operator sets dial data with the ten-key pad 81 or the one-touch keys 88 and depresses the start key 83. In this case, only the switch SW1 is changed over and sending is started.

According to this embodiment as described above, the set of dummy reader 25 and the dummy printer 23 and the set of reader 1 and the printer 5 are selectively connected to the two facsimile controllers, thereby providing a data communication apparatus having GIII and GIV modes.

The operator can reserve a mode change during sending or reception of one facsimile controller. When currently performed sending or reception is completed, the GIII and GIV modes are automatically changed over.

When the switches SW1 and SW2 are independently changed over, reception and sending can be simultaneously performed using two lines.

Since the image signal from the other facsimile controller is stored in the memory (RAM) in the mode change controller 21 (storage-receive) during reception at one facsimile controller, data can be simultaneously received from the two lines.

In the above embodiment, the facsimile system is exemplified as a data communication apparatus. The present invention is applicable to any data communication apparatus capable of being connected to different lines such as a mixed mode terminal (capable of dealing with a document including graphic and character codes) of a Teletex and GIV facsimile system.

The above embodiment exemplifies the facsimile system capable of being connected to the telephone line 3C and the digital line 4C. However, the number of lines is not limited to two, but can be increased to three or more. In this case, a communication controller is arranged to perform mode change control for three or more lines.

According to another embodiment, an image memory (i.e., a data storage memory) is arranged for each line.

Figure 5:
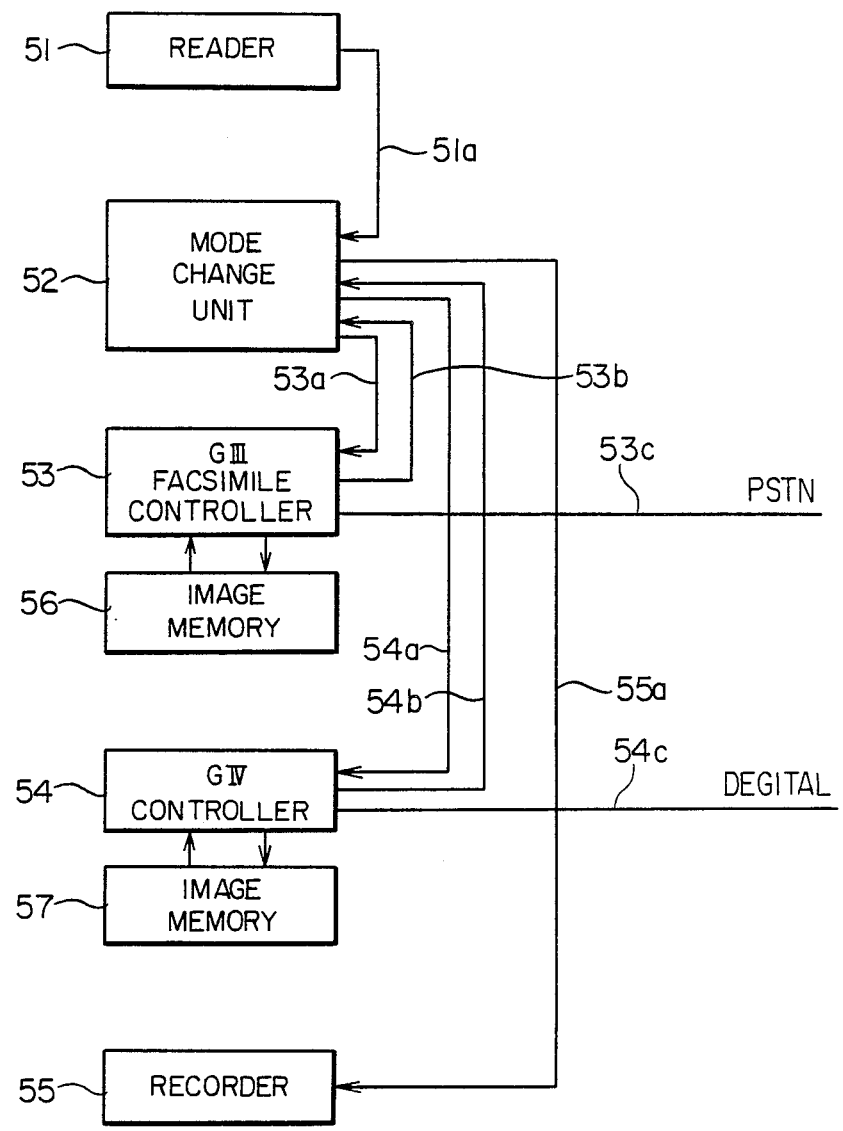
FIG. 5 is a block diagram showing an arrangement of a data communication apparatus according to another embodiment of the present invention.

FIG. 5 is a block diagram showing an arrangement of a facsimile system of this embodiment.

The facsimile system includes a reader 51 for reading an image on an original, a mode change unit 52, a GIII facsimile controller 53, a GIV facsimile controller 54, image memories 56 and 57 respectively connected to the GIII and GIV facsimile controllers 53 and 54, and a recorder 55.

The GIII facsimile controller 53 is connected to a telephone line 53C and controls the GIII mode. The GIV facsimile controller 54 is connected to a digital line 54C and controls the GIV mode. The recorder 55 outputs received image data or image data obtained when the recorder 55 is operated in the copy mode. The image memory 56 stores read image data and received image data in the GIII mode. The image memory 57 stores read image data and received image data in the GIV mode.

The mode change unit 52 receives through a signal line 51a image data read by the reader 51 and determines whether the image data is sent to the GIII or GIV facsimile controller 53 or 54. The mode change unit 52 can send to the recorder 55 image data received through a signal line 53b or 54b connected to the GIII or GIV facsimile controller 53 or 54 when the facsimile controller 53 or 54 receives this image signal. For this purpose, the mode change unit 52 has a change-over function for selecting a destination facsimile controller and a resolution conversion function for converting resolutions of the GIII and GIV modes when these modes are used. The mode change unit 52 also, comprises a console unit for changing over the GIII and GIV facsimile controllers 53 and 54.

Read/write control of the image memories in the facsimile system of this embodiment will be described below.

The send mode will be described below.

The operator selects the GIV or GIII mode at the console unit in the mode change unit 52.

The mode change unit 52 causes the reader 51 to read an original. When the operator sets the GIV mode at the console unit, the signal line 51a is switched (connected) to the signal line 54a. In this case, since the read image data has a GIII resolution, it must be converted into GIV image data. The GIV image data is sent to the GIV facsimile controller 54 through the signal line 54a.

When the operator sets the GIII mode, the signal line 51a is switched (connected) to the signal line 53a. In this case, since the read image data has a GIII resolution, it need not be converted and is sent to the GIII facsimile controller 53 through the signal line 53a.

The GIII and GIV facsimile controllers 53 and 54 control the image memories 56 and 57 to write image data, respectively. The facsimile controllers are independently operated regardless of the types of communication lines. The subsequent sending operations are the same as those of the conventional facsimile system.

Data reception will be described below.

When an incoming call is detected, the GIII and GIV facsimile controllers 53 and 54 are independently operated according to the incoming call destinations. Received image data are stored in the image memories 56 and 57, respectively. When storage-receive operations are performed as described above and are completed, the received image data are printed out at the recorder 55.

When the received image data is output to the recorder 55, the mode change unit 52 determines whether the data is received through the GIII or GIV line. If the data is received by the GIV facsimile controller 54, the signal line 54b is switched (connected) to the signal line 55a. The resolution of the GIV image data is converted to a GIII resolution so as to output the image data to the GIII facsimile controller 55. However, if the received data is the GIII data, the signal line 53b is switched (connected) to the signal line 55a and the received data is output to the recorder 55.

As described above, the image memories are respectively connected to the GIII and GIV facsimile controllers. The GIII data can be read or written in accordance with the MR or MH scheme, and the GIV data can be read or written in accordance with the MMR scheme. Unlike in the conventional facsimile system capable of being connected to a plurality of lines, image data between predetermined addresses and image data between other predetermined addresses need not be processed in accordance with the MR (or MH) scheme and the MMR scheme under the control of an image memory controller. The image data received by the GIII facsimile controller can be temporarily stored in the GIII image memory 56 and the image data can be sent by multi-address calling in both GIII and GIV modes. When the number of lines is to be increased, the number of pairs of facsimile controllers and corresponding image memories is simply increased.

Figure 6:
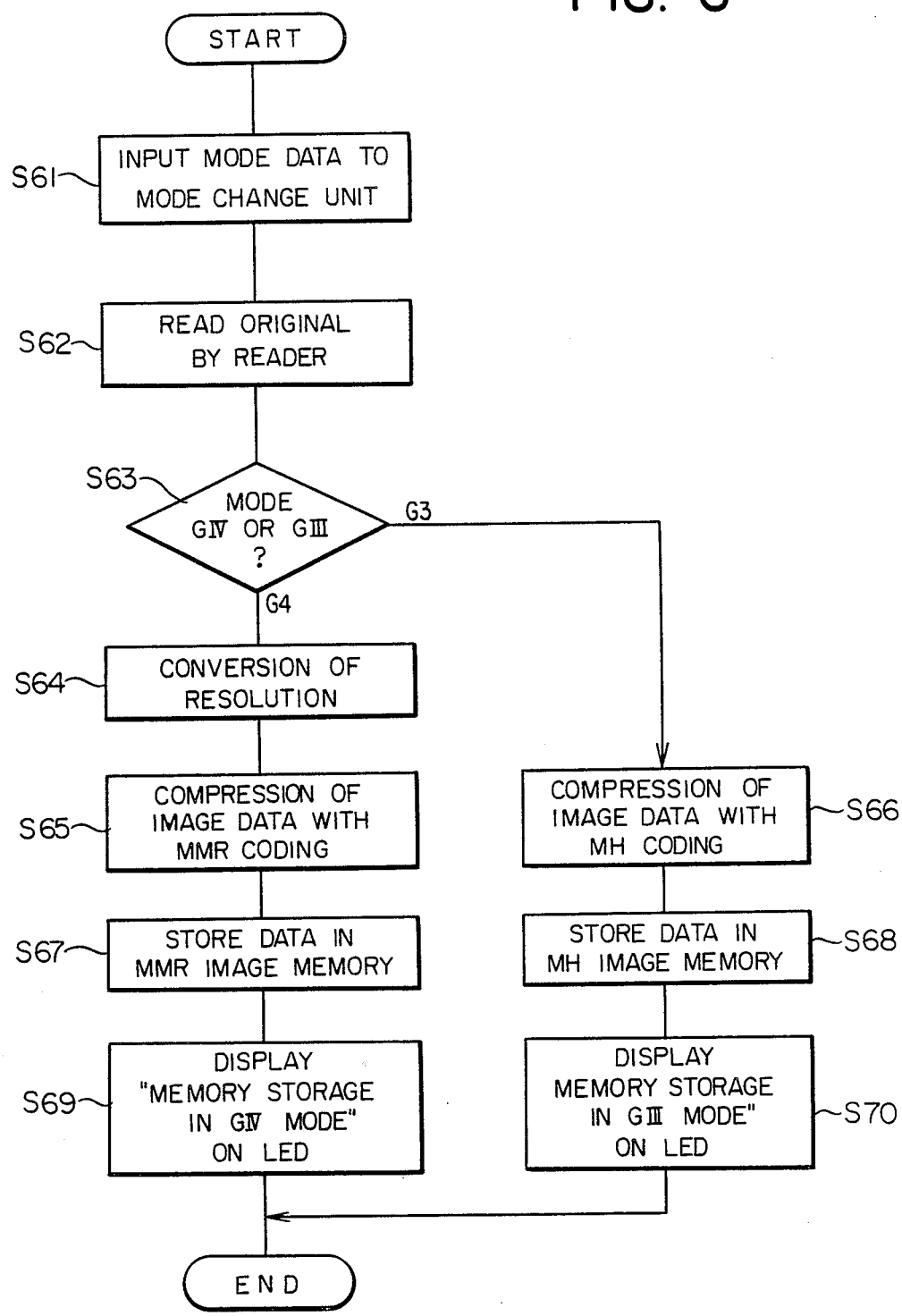
FIG. 6 is a flow chart for explaining memory storage operations in the apparatus shown in FIG. 5.

FIG. 6 is a flow chart for explaining memory storage operations in the facsimile system of FIG. 5. The memory storage operations will be described with reference to the flow chart in FIG. 6.

In step S61, the operator selects and inputs the GIII or GIV mode with the console unit in the mode change unit 52.

The operator places an original on the reader 51 and depresses a memory storage switch in the console unit in step S62, so that the reader 51 reads the image on the original.

The mode change unit 52 determines in step 63 whether the GIII or GIV mode set in step S61 is set. Image data from the reader 51 is sent to the GIII or GIV facsimile controller 53 or 54 in accordance with a determination result.

Since the image data from the reader 1 has a GIII resolution. This image data is converted into GIV image data in step S64.

In step S65 or S66, the image sent from the mode change unit 52 is compressed with MMR or MH coding by the GIV or GIII facsimile controller 53 or 54.

In step S67 or S68, the compressed image data is stored in the MH image memory for the GIII mode or the MMR image memory for the GIV mode.

In step S69 or S70, memory storage is indicated by a GIV or GIII indicator.

The image data is thus stored in the corresponding memory. During the series of operations, since the image memories are prepared for MMR and MH, respectively, MMR and MH data need not be stored in a single image memory under the control of the corresponding facsimile controllers. Therefore, loads of the controllers can be reduced.

Figure 7:
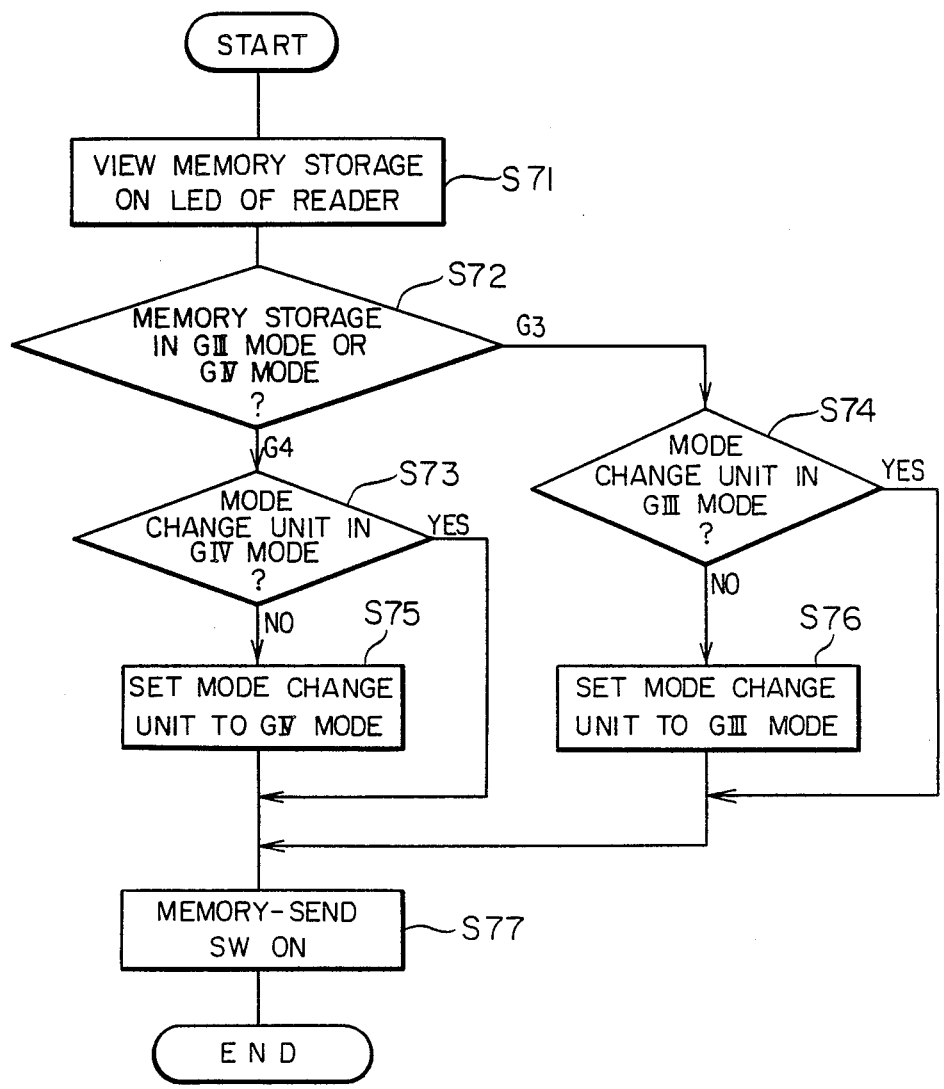
FIG. 7 is a flow chart for explaining memory-send operations in the apparatus shown in FIG. 5.

An operation will be described with reference to a flow chart of FIG. 7 when image data prestored in the memories are sent.

In steps S71 and S72, the memory storage mode is determined by viewing GIII and GIV indicators in the display unit in the reader. In order to send image data stored in the MMR image memory for the GIV mode, it is determined whether the mode change unit 52 is set in the GIV mode; if NO in this determination, the switch of the mode change unit 52 is set in the GIV position in steps S73, S74, S75, and S76.

In step S77, the operator depresses the memory-send send switch in the console unit, thereby initiating memory sending.

The GIV and GIII facsimile controllers need not identify MMR and MH codings to control the corresponding image memories so as to read out image data from the image memories. Therefore, the loads of the facsimile controllers can be reduced.

Figure 8:
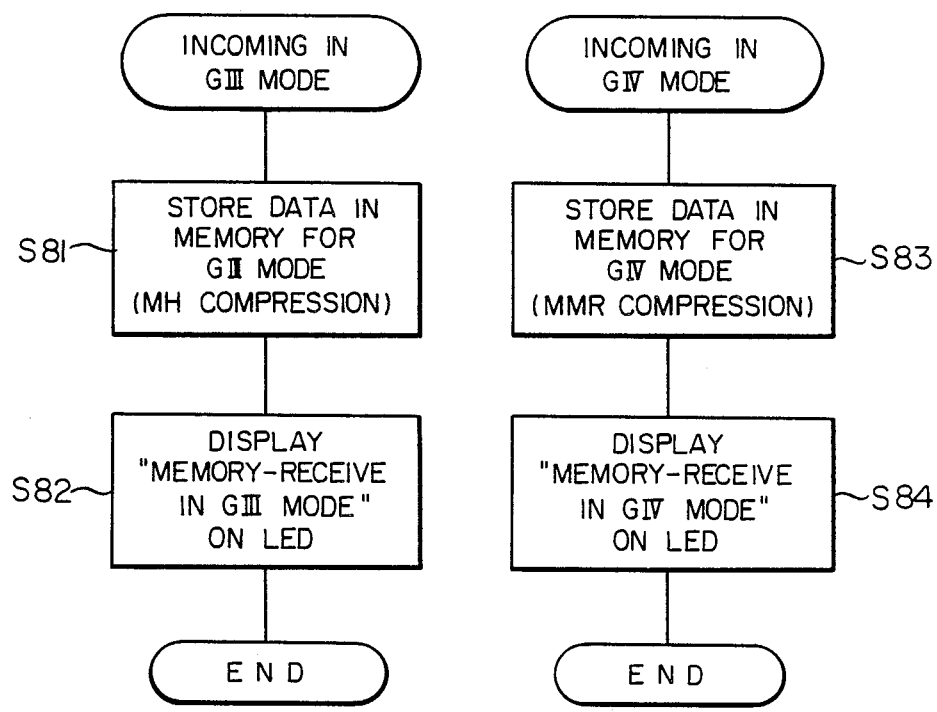
FIG. 8 is a flow chart for explaining memory-receive operations in the apparatus shown in FIG. 5.

Memory-receive mode will be described with reference to a flow chart in FIG. 8.

If an incoming call is made in the GIII or GIV mode, image data is written in the MH or MMR image memory in step S81 or S83. In step S82 or S84, reception of image data in the memory is indicated by the corresponding LED.

The facsimile controllers need not control the image memories to write the image data according to complicated control methods. Control of the image data can be simplified, as represented by the flow charts in FIG. 8.

The above embodiment exemplifies the GIII, GIV facsimile system, but the present invention is not limited thereto. The present invention is applicable to any data communication apparatus if it has communication controllers respectively corresponding to a plurality of lines and the controllers respectively have memories for storing communication data.

As described above, the image memories respectively correspond to the types of compression schemes (MR and MMR coding) or resolutions. Therefore, the loads of the facsimile controllers can be reduced.

The present invention is not limited to the particular embodiments described above. Various changes and modifications may be made within the spirit and scope of the invention as defined in the appended claims.

We claim:

1. A data communication apparatus comprising:
a first communication line;
a second communication line;
first data communication control means for controlling non-voice data communication through said first communication line;
second data communication control means for controlling non-voice data communication through said second communication line, said second data communication control means performing non-voice data communication in accordance with a communication procedure of a type different from that of said first data communication control means;
input means for inputting data;
output means for outputting data; and
mode change control means for changing over said first and second data communication control means so as to connect said first or second data communication control means to said input and output means,
wherein said first data communication control means and said second data communication control means can operate in parallel to perform said first non-voice data communication and said second non-voice data communication at the same time.

2. An apparatus according to claim 1, wherein said mode change control means connects one of said input means and said output means with said first data communication control means and connects the other of said input means and said output means with said second communication control means to permit said first and second data communication at the same time.

3. An apparatus according to claim 1, further comprising mode change designating means for designating a mode change, said mode change control means performing changeover on the basis of a mode change designation signal from said mode change designating means.

4. An apparatus according to claim 1, further comprising display means for displaying changeover states of said first and second communication control means.

5. An apparatus according to claim 1, further comprising storage means for storing data from one of said first and second communication control means when said output means is used by the other one of said first and second communication control means.

6. An apparatus according to claim 1, further comprising converting means for converting the data input from said input means when the data from said input means is to be communicated by predetermined data communication control means.

7. An apparatus according to claim 1, further comprising converting means for converting data output from predetermined data communication control means when said output means is to output the data.

8. An apparatus according to claim 7, wherein said converting means converts a resolution of the data.

9. An apparatus according to claim 1, further comprising means for transferring data from said one data communication means to said other communication means.

10. An apparatus according to claim 9, further comprising means for converting transfer data when the data is to be transferred by said transferring means.

11. A data communication apparatus comprising:
a plurality of communication lines;
input means for inputting data;
output means for outputting data;
a plurality of communication control means respectively corresponding to said plurality of communication lines, said communication means being operable in parallel and performing respective different types of data communication independently;
memory means for storing data; and
mode change means for connecting one of said plurality of communication control means to said input and output means,
wherein when one of said communication control means receives data during data output through said output means by another of said plurality of communication control means, said memory means stores the data received by said one communication control means.

12. An apparatus according to claim 11, further comprising mode change designating means for designating a mode change, said mode change control means performing changeover on the basis of a mode change designation. signal from said mode change designating means.

13. An apparatus according to claim 11, further comprising display means for displaying changeover states of siad plurality of communication control means.

14. An apparatus according to claim 11, further comprising converting means for converting the data input from said input means when the data from said input means is to be communicated by predetermined data communication control means.

15. An apparatus according to claim 11, further comprising converting means for converting data output from predetermined data communication control means when said output means is to output the data.

16. An apparatus according to claim 15, wherein said converting means converts a resolution of the data.

17. An apparatus according to claim 11, further comprising means for transferring data from said one data communication means to said other communication means.

18. An apparatus according to claim 17, further comprising means for converting transfer data when the data is to be transferred by said transferring means.

19. A data communication apparatus comprising:
first and second communication lines;
first non-voice data communication means for performing non-voice communication through said first communication line;
second non-voice data communication means for performing non-voice data communication through said second communication line, said second non-voice data communication means performing non-voice data communication in accordance with a communication procedure of a type different from that of said first data communication means;
input means for inputting data;
output means for outputting data;
connect means for selectively connecting said input means and said output means with said first non-voice data communication means or said second non-voice data communication means; and
memory means for storing data therein;
wherein said first non-voice data communication means and said second non-voice data communication means can operate in parallel; and
wherein, when one of said first and second non-voice data communication means receives data during data output through said output means by the other of said first and second non-voice data communication means, said memory means stores the data received by said one of said first and second non-voice data communication means.

20. An apparatus according to claim 19, further comprising mode change designating means for designating a mode change, said connect means performing its connection operation on the basis of a mode change designation signal from said mode change designating means.

21. An apparatus according to claim 19, further comprising display means for displaying changeover states of said first and second data communication means, 22. An apparatus according to claim 19, further comprising converting means for converting the data input from said input means when the data from said input means is to be communicated by predetermined data communication control means.

23. An apparatus according to claim 19,
wherein said connect means connects said input means with one of said first and second data communication means and connects said output means with the other of said first and second data communication means so that the transmission of data input through said input means and the output of received data through said output means is permitted in parallel at the same time.

24. An apparatus according to claim 23, wherein said connect means performs its connection operation in response to request signals from said first and second data communication means.

25. An apparatus according to claim 19, further comprising converting means for converting data output from predetermined data communication control means when said output means is to output the data.

26. An apparatus according to claim 25, wherein said converting means converts a resolution of the data.

27. An apparatus according to claim 19, further comprising means for transferring data from said one data communication means to said other communication means.

28. An apparatus according to claim 27, further comprising means for converting transfer data when the data is to be transferred by said transferring means.

29. A data communication apparatus comprising:
a first communication line;
a second communication line;
first data communication control means for controlling data communication through said first data communication line;
second data communication control means for controlling data communication through said second data communication line;
input means for inputting data;
output means for outputting data;
mode change control means for change over said first and second communication control means so as to connect said first or second communication control to said input and output means; and
dummy input means and dummy output means, both of which output response signals in response to signals from said first and second communication control means, said mode change control means connecting said dummy input and output means to one of the first and second communication control means which is not connected to said input and output means.

30. A data communication apparatus comprising:
a plurality of communication lines;
input means for inputting data;
output means for outputting data;
a plurality of communication control means respectively corresponding to said plurality of communication lines;
a plurality of storage means for storing different types of data;
mode change means for connecting one of said plurality of communication control means to said input and output means, wherein communication data from said plurality of communication control means are stored in said plurality of storage means in accordance with the types of data; and
dummy input and dummy output means, both of which output response signals in response to signals from said plurality of communication control means, said mode change control means connecting said dummy input and output means to one of said plurality of communication means which is not connected to said input and output means.

* * * * *

UNITED STATES PATENT AND TRADEMARK OFFICE
CERTIFICATE OF CORRECTION

PATENT NO. : 4,974,097

DATED : November 27, 1990

INVENTOR(S) : YOJI KANEKO, ET AL.

It is certified that error appears in the above-identified patent and that said Letters Patent is hereby corrected as shown below:

COLUMN 6

Line 27, "from 25" should read --from the facsimile controller, connected to the dummy reader 25--.

COLUMN 9

Line 54, "aboye" should read --above--.

COLUMN 11

Line 40, "resolution. This" should read --resolution, this--.

COLUMN 12

Line 2, "send" should be deleted.

COLUMN 13

Line 57, "designation." should read --designation--.

COLUMN 14

Line 50, "means," should read --means.--.

UNITED STATES PATENT AND TRADEMARK OFFICE
CERTIFICATE OF CORRECTION

PATENT NO. : 4,974,097

DATED : November 27, 1990

INVENTOR(S) : YOJI KANEKO, ET AL.

It is certified that error appears in the above-identified patent and that said Letters Patent is hereby corrected as shown below:

COLUMN 16

Line 28, "communication" should read --communication control--.

Signed and Sealed this

Twenty-sixth Day of January, 1993

Attest:

STEPHEN G. KUNIN

Attesting Officer      Acting Commissioner of Patents and Trademarks